(12) United States Patent
Kumar et al.

(10) Patent No.: US 10,489,203 B2
(45) Date of Patent: Nov. 26, 2019

(54) SYSTEM AND METHOD FOR USING AN IN-MEMORY DATA GRID TO IMPROVE PERFORMANCE OF A PROCESS DEFINED BY A PROCESS EXECUTION LANGUAGE IN A SOA MIDDLEWARE ENVIRONMENT

(71) Applicant: Oracle International Corporation, Redwood Shores, CA (US)

(72) Inventors: Yogesh Kumar, San Jose, CA (US); Michal Chmielewski, Sunnyvale, CA (US); Murali Pottlapelli, Chino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 508 days.

(21) Appl. No.: 15/075,723

(22) Filed: Mar. 21, 2016

(65) Prior Publication Data

US 2016/0292008 A1 Oct. 6, 2016

Related U.S. Application Data

(60) Provisional application No. 62/142,906, filed on Apr. 3, 2015.

(51) Int. Cl.
*G06F 9/50* (2006.01)
*G06F 16/23* (2019.01)

(52) U.S. Cl.
CPC ........ *G06F 9/5016* (2013.01); *G06F 16/2365* (2019.01)

(58) Field of Classification Search
CPC .......................... G06F 9/5016; G06F 16/2365
See application file for complete search history.

(56) References Cited

U.S. PATENT DOCUMENTS 6,105,148 A * 8/2000 Chung ................ G06F 11/1438
714/16
7,689,748 B2 * 3/2010 Grossman ............... G06F 13/24
710/261

(Continued)

OTHER PUBLICATIONS

Paul Colmer, In Memory Data Grid Technologies, Dec. 21, 2011, http://highscalability.com/blog/2011/12/21/in-memory-data-grid-technologies.html.*

(Continued)

*Primary Examiner* — Benjamin C Wu
(74) *Attorney, Agent, or Firm* — Tucker Ellis LLP (57) ABSTRACT

In accordance with an embodiment, described herein is a system and method for improving performance of an executable process defined by a process execution language in a service-oriented architecture (SOA) middleware environment. Flow states and audit data of a process instance can be stored in a dehydration store implemented on a distributed in-memory data grid, and transferred to a persistent storage at a configurable interval, or at certain state changes such as completions and faults of the process instance. A user interface can be used to configure the persistence policy for the process instance, and to retrieve the flow states and audit data from the persistent storage for process monitoring and diagnosis. The flow states data in the persistent storage can also be used for resuming execution of the process instance after a planned system maintenance, or a system crash.

20 Claims, 5 Drawing Sheets

(56) References Cited

U.S. PATENT DOCUMENTS

| | | | | |
|---|---|---|---|---|
| 7,823,153 | B1* | 10/2010 | Pashenkov | G06F 11/1407 714/13 |
| 8,370,493 | B2* | 2/2013 | Sirota | G06F 9/485 709/201 |
| 9,104,714 | B2* | 8/2015 | Markus | G06F 16/23 |
| 9,110,711 | B2* | 8/2015 | Abdelaziz | G06F 9/465 |
| 9,569,255 | B1* | 2/2017 | Johnson | G06F 9/4887 |
| 2004/0255296 | A1* | 12/2004 | Schmidt | G06F 9/4887 718/100 |
| 2007/0083645 | A1* | 4/2007 | Roeck | G06F 11/2028 709/224 |
| 2007/0266197 | A1* | 11/2007 | Neyama | G06F 3/0613 710/310 |
| 2010/0017655 | A1* | 1/2010 | Gooding | G06F 11/1482 714/16 |
| 2010/0162238 | A1* | 6/2010 | Warfield | G06F 9/5077 718/1 |
| 2011/0055372 | A1* | 3/2011 | Elyashev | G06F 9/4418 709/224 |
| 2013/0185603 | A1* | 7/2013 | Parra | G06F 11/0709 714/48 |
| 2013/0219044 | A1* | 8/2013 | Maheshwari | H04L 43/045 709/224 |
| 2015/0074351 | A1* | 3/2015 | Avati | G06F 17/30132 711/118 |
| 2015/0237231 | A1* | 8/2015 | Hirose | H04N 1/00204 358/1.15 |
| 2016/0026546 | A1* | 1/2016 | Ljubuncic | G06F 11/1469 714/19 |
| 2016/0266982 | A1* | 9/2016 | Iyengar | G06F 11/1469 |
| 2017/0289133 | A1* | 10/2017 | Yang | H04W 12/06 |

OTHER PUBLICATIONS

Oracle®, Oracle® BPEL Process Manager Installation Guide 10g Release 2 (10.1.2) for Solaris Operating Environment (SPARC), Linux x86, and Microsoft Windows, "1 Overview of Oracle BPEL Process Manager", 7 pages, retrieved on Nov. 3, 2014.

* cited by examiner

SYSTEM AND METHOD FOR USING AN IN-MEMORY DATA GRID TO IMPROVE PERFORMANCE OF A PROCESS DEFINED BY A PROCESS EXECUTION LANGUAGE IN A SOA MIDDLEWARE ENVIRONMENT

CLAIM OF PRIORITY

This application claims the benefit of priority to U.S. Provisional Application titled "SYSTEM AND METHOD FOR PROVIDING IN-MEMORY INTEGRATION OF A BPEL PROCESS", Application No. 62/142,906, filed Apr. 3, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to service-oriented architecture (SOA), and are particularly related to a system and method for using a distributed in-memory data grid to improve performance of a process defined by a process execution language in a SOA middleware environment.

BACKGROUND

A process execution language enables developers to model work flows as processes that comprise stateful interactions with one or more external services. When execution of a process instance cannot be continued in a current thread, the process instance can be dehydrated, wherein flow states of the process instance can be persisted to a database.

When a process execution engine is ready to execute the process instance again, the stored flow states can be reconstructed (rehydrated) from the database. However, the overhead of interactions with the database can be significant, and the time spent persisting to and restoring from the database often slows down execution time of the process instance.

SUMMARY

In accordance with an embodiment, described herein is a system and method for improving performance of an executable process defined by a process execution language in a service-oriented architecture (SOA) middleware environment. Flow states and audit data of a process instance can be stored in a dehydration store implemented on a distributed in-memory data grid, and transferred to a persistent storage at a configurable interval, or at certain state changes such as completions and faults of the process instance. A user interface can be used to configure the persistence policy for the process instance, and to retrieve the flow states and audit data from the persistent storage for process monitoring and diagnosis. The flow states data in the persistent storage can also be used for resuming execution of the process instance after a planned system maintenance, or a system crash.

DETAILED DESCRIPTION

Typically, when a thread executing an instance of a process defined by a process execution language (e.g., a business process execution language (BPEL)) cannot continue, a process execution engine (e.g., a BPEL engine) can persist flow states and audit trails of the process instance to a database, and the thread can dissociate itself from an identifier of the process instance. When execution of the process instance is to be resumed, the stored flow states of the process instance can be reconstructed from the database, and the thread can associate itself again with the process instance identifier.

In addition, the database can serve as a channel for inter-thread communication for flow state exchanges and centralized monitoring, as a process defined by a process execution language often can be simultaneously executed by more than one thread (as determined by a composite model).

As such, the process execution engine needs to constantly interact with the database. The overhead of these database interactions can be significant, and the time spent persisting to and restoring from the database can slow down the execution time of a particular process instance.

In accordance with an embodiment, described herein is a system and method for improving performance of an executable process defined by a process execution language in a service-oriented architecture (SOA) middleware environment. Flow states and audit data of a process instance can be stored in a dehydration store implemented on a distributed in-memory data grid, and transferred to a persistent storage at a configurable interval, or at certain state changes such as completions and faults of the process instance. A user interface can be used to configure the persistence policy for the process instance, and to retrieve the flow states and audit data from the persistent storage for process monitoring and diagnosis. The flow states data in the persistent storage can also be used for resuming execution of the process instance after a planned system maintenance, or a system crash.

In accordance with an embodiment, the interval can be a period of time (write-behind delay interval) specified by a write-behind delay parameter configured for the distributed in-memory data grid. When execution of the process instance completes before the interval elapses, a single trip by the distributed in-memory data grid to the persistent storage can be used for persisting the flow states and audit data of the process instance. When the process instance execution completes after the interval elapses, multiple state updates to the process instance during the write delay interval can be persisted in one trip to the persistent storage.

In accordance with an embodiment, a separate worker thread, instead of the thread executing the process instance, can be used to perform the persistence operation, which can help maintain response time of the process instance for load peaks.

In accordance with an embodiment, the distributed in-memory data grid can maintain a write-behind queue of the data that needs to be updated to the persistent storage. When a cache entry in a dehydration store is updated, the cache entry can be added to the write-behind queue if it is not there already; otherwise, it is replaced. After the specified period of time, the distributed in-memory data grid can update the persistent storage with the latest state of the cache entry.

The features described above can use a distributed in-memory data grid associated with an application server to execute instances of the executable process in memory, which can improve performance and scalability of the process instances, as read and write operations are performed out of one or more caches. Performance and management of the backend persistent storage can also be improved, as performance costs associated with continuous disk reads and writes are significantly reduced.

Figure 1:
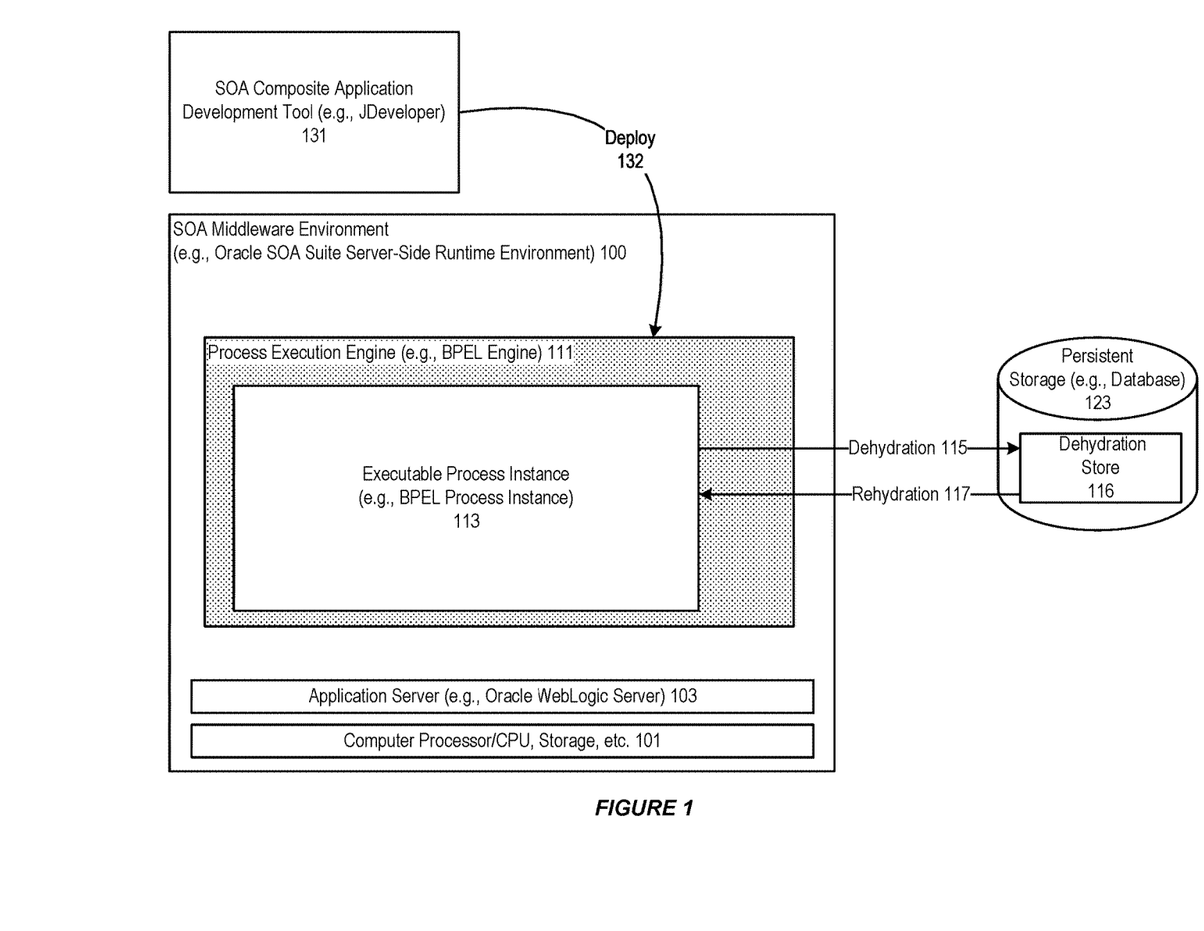
FIG. 1 illustrates a typical SOA environment for designing and executing a process defined by a process execution language, in accordance with an embodiment.

FIG. 1 illustrates a typical SOA environment for designing and executing a process defined by a process execution language, in accordance with an embodiment.

As shown in FIG. 1, the system can include a SOA composite application development tool (for example, Oracle's JDeveloper and similar interactive development environments) 131, and a SOA middleware environment 100. A user (for example, a developer) can use the development tool to design an executable process using a process executable language such as BPEL, to model a collection of related, structured tasks that produce a specific service or product. The executable process can be deployed 132 to a process execution engine (e.g., a BPEL engine) 111 on an application server (for example, WebLogic Server) 103 executing on a computer processor 101.

In accordance with an embodiment, after being deployed, an instance 113 of the executable process can be instantiated. Flow states and audit data of the executable process can be stored (dehydrated) 115 into a dehydration store (for example, a database schema) 116 in a persistent storage 123. The flow states in the dehydration store can be retrieved hydrated) 117 from the persistent storage for resuming executing the process instance, or for trouble shooting.

In accordance with an embodiment, the flow states data can include an active instance count, unhandled faults, recoverable faults, and flow events. The audit data can include component audit events and message payloads.

As shown in FIG. 1, the flow states and audit data of the process instance is persisted to the persistent storage. For a long running process instance that needs to interact with the persistent storage in multiple roundtrips to store and retrieve the flow states data, the interactions can slow down the execution of the process instance.

Figure 2:
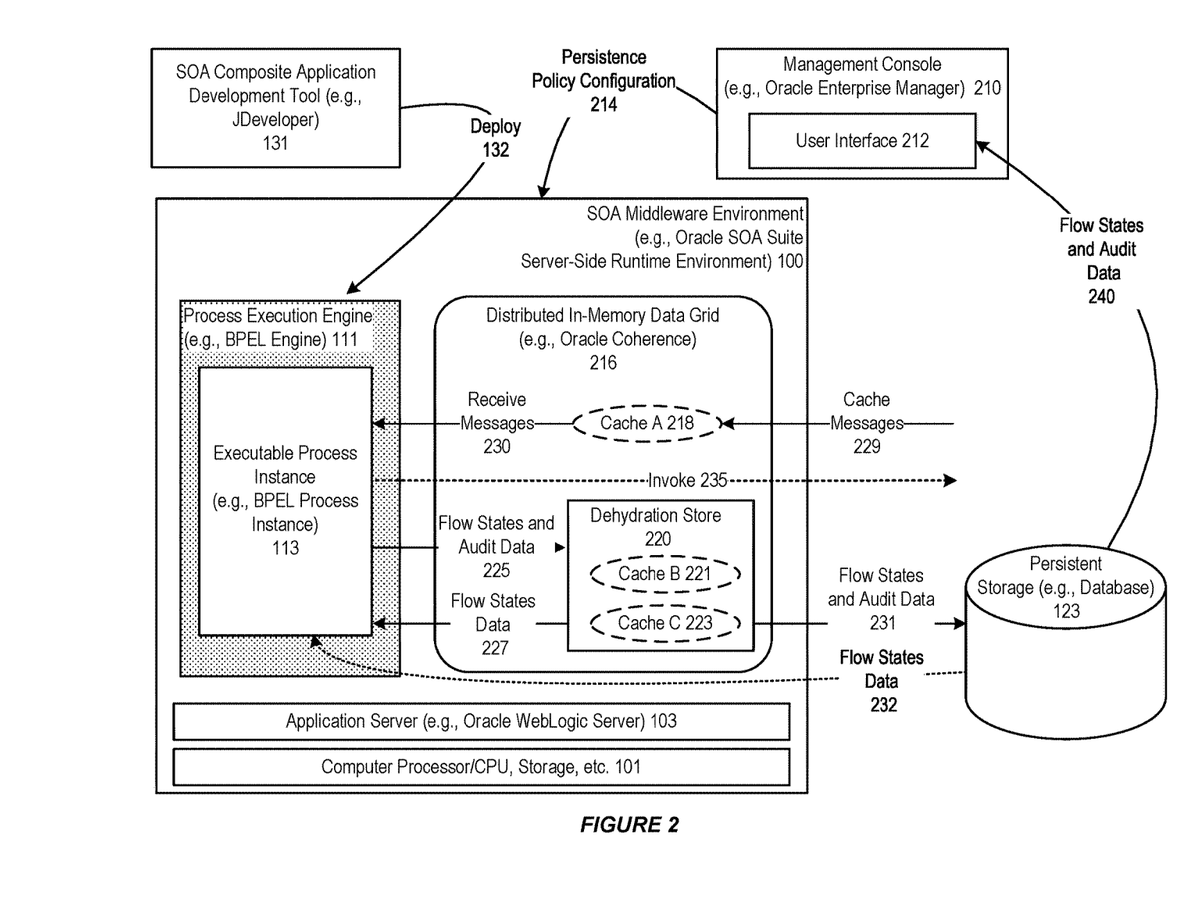
FIG. 2 illustrates a system for using a distributed in-memory data grid to improve performance of a process defined by a process execution language in a SOA middleware environment.

FIG. 2 illustrates a system for using a distributed in-memory data grid to improve performance of a process defined by a process execution language in a SOA middleware environment.

As shown in FIG. 2, the system can include a distributed in-memory data grid (for example, Oracle Coherence framework) 216 comprising a plurality of caches (for example, cache A 218, cache B 221, and cache C 223). A cache (for example, cache A) can be used for caching messages 229 from an external service. The cache messages can be received 230 from the cache into the executable process instance.

As further shown in FIG. 2, the executable process instance can invoke 235 an external service, and while waiting for a reply from the invoked service, can store (dehydrate) 225 flow states and audit data of the process instance into a dehydration store implemented on the distributed in-memory data grid. When the reply is received, the flow states can be retrieved (rehydrated) 227 for resuming execution of the process instance.

In accordance with an embodiment, the dehydration store can include a schema for storing flow states and audit data of the process instance, and can be implemented on one or more caches (For example, cache B and cache C) in the distributed in-memory data grid.

In accordance with an embodiment, the flow states and audit data can be written 231 using a separate thread other than a thread executing the process instance, to the persistent storage at an interval defined by a write-behind delay parameter on the distributed in-memory data grid.

As show in FIG. 2, the flow states and audit data can be initially persisted to one or more caches. A separate write-behind thread can perform a deferred write of the cached data to the persistent storage. The write-behind thread can wake up at periodic intervals as configured. A default interval (for example, 5 minutes) can be provided if a write-behind delay parameter is not set. If the write-behind delay parameter is configured appropriately, the flow instance data can be written to the persistent storage every time the write-behind thread wakes up, which can reduce the number of roundtrips to the persistent storage.

In accordance with an embodiment, a management console (for example, Oracle enterprise manager) 210 can be used to retrieve 240 the flow states and audit data from the persistent storage for display at a user interface 212, for use in monitoring the execution of the process instance, and analyzing and tracking down causes for a failed execution of the process instance. The flow states in the persistent storage can also be used 232 for resuming execution of the process instance after a planned system maintenance, or a system crash.

In accordance with an alternative embodiment, the flow states and audit data in the distributed in-memory data grid is not persisted from the dehydration store to the persistent storage when the process instance executes successfully. Instead, the flow states and audit data is persisted to the persistent storage only if the process instance encounters a fault. Once the flow has been recovered, all flow states and audit data can be purged from caches of the distributed in-memory data grid, and from the persistent storage.

In accordance with an embodiment, the management console can also be used to configure 214 a persistence policy for the process instance. The persistence policy can determine whether the flow states and audit data is to be persisted directly to a persistent storage, or to one or more caches first; and whether the stored data in the caches is to be transferred to the persistent storage at a write-behind delay interval, or only when the process instance encounters a fault or another special event. If the write-behind delay policy is configured for use with a process instance, a write-behind delay interval can be defined at the management console.

Figure 3:
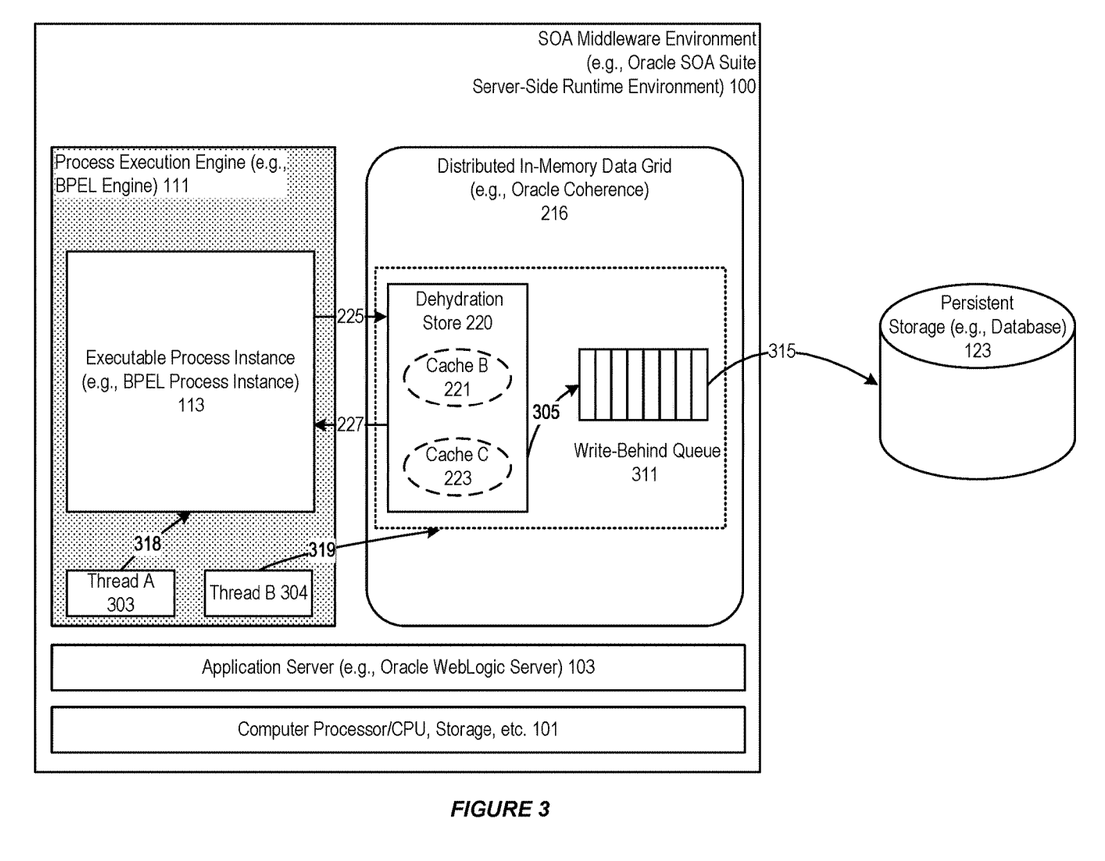
FIG. 3 further illustrates a system for using a distributed in-memory data grid to improve performance of a process defined by a process execution language in a SOA middleware environment.

FIG. 3 further illustrates a system for using a distributed in-memory data grid to improve performance of a process defined by a process execution language in a SOA middleware environment.

As shown in FIG. 3, the write-behind caching feature can be implemented using an in-memory queue (for example, a write-behind queue 311) in the distributed in-memory data grid, to asynchronously write modified cache entries in the dehydration store to the persistent storage.

In accordance with an embodiment, the write-behind queue can include data that needs to be updated to the persistent storage. When a cache entry in the dehydration store is updated, the cache entry can be added 305 to the write-behind queue (if it isn't there already; otherwise, it is replaced), and after a specified write-behind delay interval or at a particular event of the process instance, the distributed in-memory data grid can update 315 the persistent storage with the latest state of the cache entry.

As further shown, a separate thread (for example, thread B 304) from a thread (for example, thread A 303) executing 318 the executable process instance can be used to perform 319 the asynchronous data transfer using a write-behind queue from the dehydration store to the persistent storage.

Figure 4:
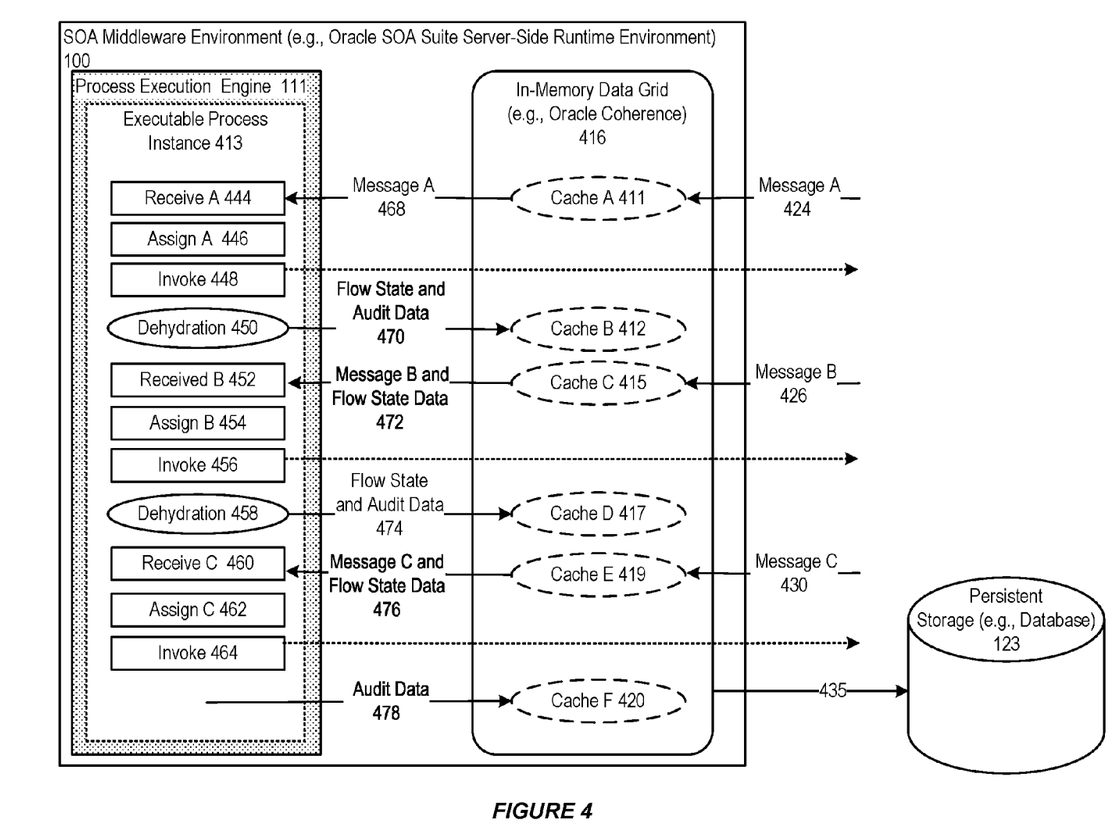
FIG. 4 further illustrates a system for using a distributed in-memory data grid to improve performance of a process defined by a process execution language in a SOA middleware environment.

FIG. 4 further illustrates a system for using a distributed in-memory data grid to improve performance of a process defined by a process execution language in a SOA middleware environment.

As shown in FIG. 4, a long-running instance of an executable process (for example, a BPEL process instance) 413 defined by a process execution language can include a plurality of Receive activities (for example, Receive A 444, Receive B 452, and Receive C 460), a plurality of Assign activities (for example, Assign A 446, Assign B 454, and Assign C 462), and a plurality of Invoke activities (for example, Invoke 448, Invoke 456, and Invoke 464). During its execution, the process instance can receive a plurality of messages (for example, message A 424, message B 426, and message C 430) from a plurality of external services.

As further shown, the process instance can interact with the external services through a distributed in-memory data grid 416 that includes a plurality of caches (for example, cache A 411, cache B 412, cache C 415, cache D 417, cache E 419 and cache F 420). Flow state and audit data of the process instance can be stored 470 and 474 into caches in the distributed in-memory data grid at dehydration points 450 and 458. Near the end of the execution of the process instance, audit data alone (without flow state data) can be stored 478 into the distributed in-memory data grid. The stored flow state and audit data in the caches can be transferred 435 at configured write-behind delay interval, or at a particular event of the process instance, to the persistent storage. The flow states data, when needed by the process instance, can be read 472 and 476 from in the distributed in-memory data grid to reconstruct the states of the process instance so that its execution can be resumed.

In accordance with an embodiment, each message from an external service can also be stored into a cache, and read 468, 472 and 476 by a Receive activity of the process instance from a cache in the distributed in-memory data grid during the execution of the process instance.

As shown in FIG. 4, the process instance relies on caches in the distributed in-memory data grid to store the flow states and audit data, which can be transferred to the persistent storage at a configured interval, or at a particular event, to reduce interactions with a persistent storage. Compared to the traditional approach that relies on a database for dehydration and rehydration, the approach described above can reduce loads/IOs on a database, thereby speeding up the execution of the process instance.

Figure 5:
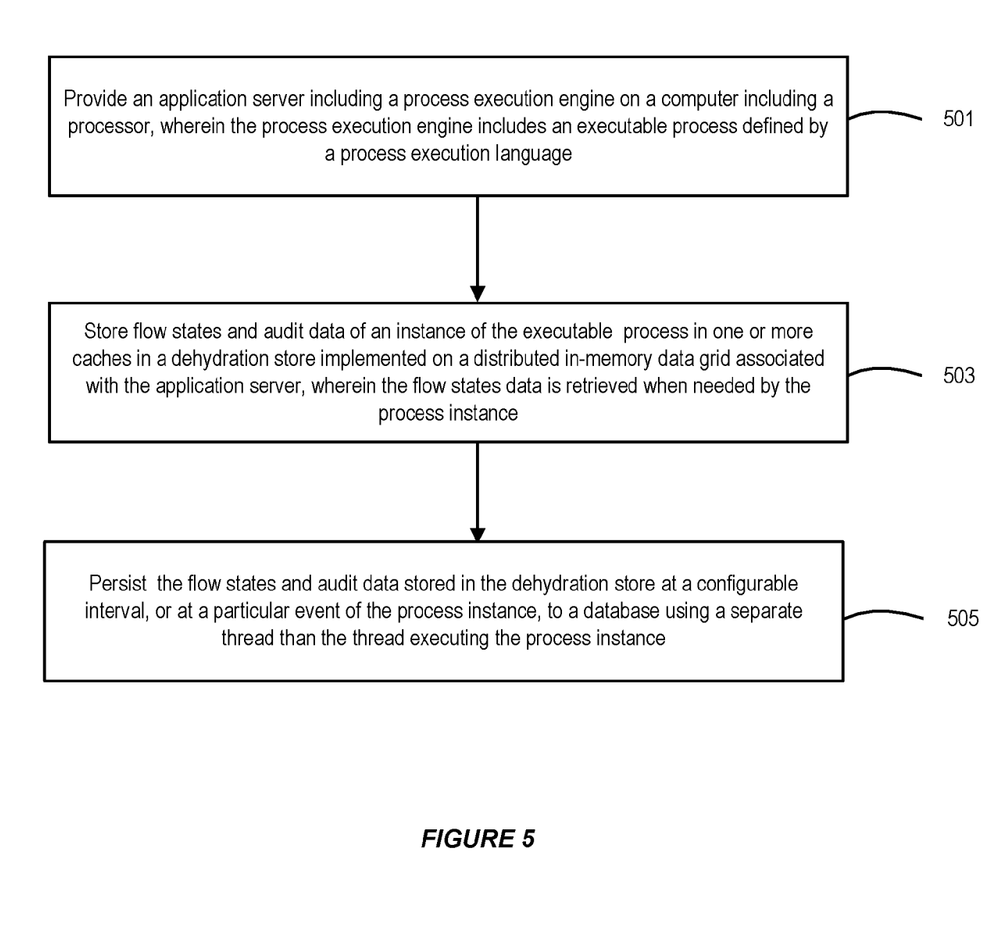
FIG. 5 illustrates a method for using a distributed in-memory data grid to improve performance of a process defined by a process execution language in a SOA middleware environment.

FIG. 5 illustrates a method for using a distributed in-memory data grid to improve performance of a process defined by a process execution language in a SOA middleware environment.

As shown in FIG. 5, at step 501, an application server including a process execution engine is provided on a computer including a processor, wherein the process execution engine includes an executable process defined by a process execution language.

At step 503, flow states and audit data of an instance of the executable process can be stored in one or more caches in a dehydration store implemented on a distributed in-memory data grid associated with the application server, wherein the flow states data can be retrieved when needed by the process instance.

At step 505, the flow states and audit data stored in the dehydration store can be persisted at a configurable interval, or at a particular event of the process instance, to a persistent storage using a separate thread than the thread executing the BPEL process instance.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for improving performance of a process defined by a process execution language, the system comprising:
   a computer comprising one or more microprocessors;
   an application server executing on the computer, the application server comprising a process execution engine and an executable process executing on the process execution engine, wherein the executable process is defined by a process execution language; and an in-memory data grid associated with the application server, wherein the in-memory data grid comprises:
   a message cache storing messages directed to an instance of the executable process from an associated process external to the system;
   a write-behind queue; and
   a dehydration store storing flow states and audit data of the instance of the executable process,
   wherein when a cache entry in the dehydration store is updated, the cache entry is added to the write-behind queue;
wherein the server executing on the computer operates to dehydrate the instance of the executable process as a dehydrated instance of the executable process by storing the flow states and the audit data of the instance of the executable process to the dehydration store of the in-memory data grid,
wherein the server executing on the computer operates to rehydrate the dehydrated instance of the executable process by retrieving the flow states and the audit data of the instance of the executable process from the dehydration store of the in-memory data grid, and reading from the message cache of the in-memory data grid the messages directed to the instance of the executable process from the associated process external to the system,
wherein the server executing on the computer operates to persist the flow states and the audit data of the instance of the executable process from the in-memory data grid to an associated persistent storage database responsive to a fault encountered by the instance of the executable process during its execution.

2. The system of claim 1, further comprising:
a management console, wherein the management console comprising a user interface for displaying the flow states and audit data from the associated database for diagnosing and monitoring the instance of the executable process.

3. The system of claim 2, wherein the management console comprises settings configured to determine whether the stored data in the in-memory data grid is transferred to the associated database at a write-behind delay interval, or at a particular event of the process instance.

4. The system of claim 1, wherein the flow states and the audit data are persisted to the associated database by a separate thread than a thread executing the instance of the executable process.

5. The system of claim 1, wherein the in-memory data grid comprises a distributed in-memory data grid.

6. The system of claim 1, wherein the flow states and the audit data of the instance of the executable process are persisted to the associated database responsive exclusively to the fault encountered by the instance of the executable process during its execution.

7. The system of claim 1, wherein the executable process is rehydrated by retrieving the persisted flow states from the associated database for resuming execution of the instance of the executable process after a crash of the system.

8. A method in a computer system comprising a memory device and a processor executing logic stored in the memory device for improving performance of a process defined by a process execution language, the method comprising:
   executing an application server on the computer system, wherein the application server comprises a process execution engine and an executable process executing on the process execution engine, wherein the executable process is defined by a process execution language;
   providing in the memory device an in-memory data grid associated with the application server, wherein the in-memory data grid comprises:
      a message cache for storing messages directed to an instance of the executable process from an associated process external to the system;
      a write-behind queue; and
      a dehydration store for storing flow states and audit data of the instance of the executable process;
   detecting that a cache entry in the dehydration store is updated;
   adding the updated cache entry to the write-behind queue;
   dehydrating the instance of the executable process as a dehydrated instance of the executable process by storing the flow states and the audit data of the instance of the executable process to the dehydration store of the in-memory data grid;
   rehydrating the dehydrated instance of the executable process by retrieving the flow states and the audit data of the instance of the executable process from the dehydration store of the in-memory data grid, and reading from the message cache of the in-memory data grid the messages directed to the instance of the executable process from the associated process external to the system; and
   persisting the flow states and the audit data of the instance of the executable process from the in-memory data grid to an associated persistent storage database responsive to a fault encountered by the instance of the executable process during its execution.

9. The method of claim 8, further comprising:
retrieving, via a user interface on a management console, the flow states and the audit data from the associated database for diagnosing and monitoring the instance of the executable process.

10. The method of claim 9, wherein the management console comprises settings configured to determine whether the stored data in the in-memory data grid is transferred to the associated database at a write-behind delay interval, or at a particular event of the process instance.

11. The method of claim 8, comprising persisting the flow states and the audit data to the associated database by a separate thread than a thread executing the instance of the executable process.

12. The method of claim 8, wherein providing the in-memory data grid in the memory device comprises providing a distributed in-memory data grid in the memory device.

13. The method of claim 8, wherein persisting the flow states and the audit data of the instance of the executable process to the associated database comprises persisting the flow states and the audit data of the instance of the executable process to the associated database responsive exclusively to the fault encountered by the instance of the executable process during its execution.

14. The method of claim 8, wherein the executable process is rehydrated by retrieving the persisted flow states from the associated database for resuming execution of the instance of the executable process after a crash of the computer system.

15. A non-transitory computer-readable storage medium storing instructions thereon that when executed by one or more processors of a computer system comprising a memory device and one or more processors, cause the one or more processors to perform steps for improving performance of a process defined by a process execution language comprising:

executing an application server on the computer system, wherein the application server comprises a process execution engine and an executable process executing on the process execution engine, wherein the executable process is defined by a process execution language;

providing in the memory device an in-memory data grid associated with the application server, wherein the in-memory data grid comprises:

a message cache for storing messages directed to an instance of the executable process from an associated process external to the system;

a write-behind queue; and a dehydration store for storing flow states and audit data of the instance of the executable process;

detecting that a cache entry in the dehydration store is updated;

adding the updated cache entry to the write-behind queue;

dehydrating the instance of the executable process as a dehydrated instance of the executable process by storing the flow states and the audit data of the instance of the executable process to the dehydration store of the in-memory data grid;

rehydrating the dehydrated instance of the executable process by retrieving the flow states and the audit data of the instance of the executable process from the dehydration store of the in-memory data grid, and reading from the message cache of the in-memory data grid the messages directed to the instance of the executable process from the associated process external to the system; and     persisting the flow states and the audit data of the instance of the executable process from the in-memory data grid to an associated persistent storage database responsive to a fault encountered by the instance of the executable process during its execution.

16. The non-transitory computer-readable storage medium of claim 15, further comprising:

retrieving, via a user interface on a management console, the flow states and the audit data from the associated database for diagnosing and monitoring the instance of the executable process.

17. The non-transitory computer-readable storage medium of claim 16, wherein the management console settings configured to determine whether the stored data in the in-memory data grid is transferred to the associated database at a write-behind delay interval, or at a particular event of the instance of the executable process.

18. The non-transitory computer-readable storage medium of claim 15, wherein providing the in-memory data grid in the memory device comprises providing a distributed in-memory data grid in the memory device.

19. The non-transitory computer-readable storage medium of claim 15, wherein persisting the flow states and the audit data of the instance of the executable process to the associated database comprises persisting the flow states and the audit data of the instance of the executable process to the associated database responsive exclusively to the fault encountered by the instance of the executable process during its execution.

20. The non-transitory computer-readable storage medium of claim 15, further comprising persisting the data to the associated database by a separate thread than a thread executing the instance of the executable process.

* * * * *

UNITED STATES PATENT AND TRADEMARK OFFICE
CERTIFICATE OF CORRECTION

PATENT NO.         : 10,489,203 B2
APPLICATION NO.    : 15/075723
DATED              : November 26, 2019
INVENTOR(S)        : Kumar et al.

It is certified that error appears in the above-identified patent and that said Letters Patent is hereby corrected as shown below:

In the Specification

In Column 3, Line 48, delete "hydrated)" and insert -- (hydrated) --, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*